United States Patent [19]

Hegeman et al.

[11] Patent Number: 5,024,949
[45] Date of Patent: Jun. 18, 1991

[54] AEROBIC BACTERIAL REMEDIATION OF ALIPHATIC CHLORINATED HYDROCARBON CONTAMINATION

[75] Inventors: George D. Hegeman, Bloomington, Ind.; David G. Nickens, Eau Claire, Wis.

[73] Assignee: BioTrol, Inc., Chaska, Minn.

[21] Appl. No.: 312,599

[22] Filed: Feb. 17, 1989

[51] Int. Cl.$^5$ .................................................. C02F 3/34
[52] U.S. Cl. .................................... 435/262; 435/264; 435/874
[58] Field of Search ...................... 435/262, 264, 874

[56] References Cited

PUBLICATIONS

E. J. Bouwer et al., *Appl. Environ. Microbiol.,* 45, 1286–1294 (1983).
T. M. Vogel et al., *Appl. Environ. Microbiol.,* 49, 1080–1083 (1985).
C. D. Little et al., *Appl. Environ. Microbiol.,* 54, 951–956 (Apr. 1988).
J. T. Wilson et al., *Appl. Environ. Microbiol.,* 49, 242–243 (1985).
M. J. K. Nelson et al., *Appl. Environ. Microbiol.,* 54, 604–606 (Feb. 1988).
L. P. Wackett et al., *Appl. environ. Microbiol.,* 54, 1703–1708 (Jul. 1988).
R. Y. Stanier et al., *J. Gen. Microbiol.,* 43, 159–271 (1966).
M. J. K. Nelson et al., *Appl. Environ. Microbiol.,* 52, 383–384 (1986).
M. J. K. Nelson et al., *Appl. Environ. Microbiol.,* 53, 949–954 (1987).
T. E. Patt et al., *J. Bacteriol.,* 120, 955–964 (1974).
Letter from American Type Culture Collection dated Feb. 23, 1989.
Nelson et al., Chem. Abst., vol. 110 (1989), p. 44715f.
Wackett et al., Chem. Abst. vol. 109 (1988), p. 107,517v.
Nelson et al., Chem. Abst. vol. 108 (1988), p. 128,272f.

*Primary Examiner*—Sam Rosen
*Attorney, Agent, or Firm*—Merchant, Gould, Smith, Edell, Welter & Schmidt

[57] ABSTRACT

A bacterium of the genus Pseudomonas which utilizes a branched chain alkyl-substituted aromatic hydrocarbon as its sole carbon and energy source and which is capable of substantially complete degradation of trichlorethylene (TCE) at a rate of up to about 32 nmol hr$^{-1}$ mg cells$^{-1}$ based upon the dry weight of the cells, and methods utilizing the bacterium for the detoxification of TCE-contaminated material.

22 Claims, 2 Drawing Sheets

5,024,949

AEROBIC BACTERIAL REMEDIATION OF ALIPHATIC CHLORINATED HYDROCARBON CONTAMINATION

FIELD OF THE INVENTION

This invention relates to methods of biologically degrading chlorinated aliphatic hydrocarbons, including 1,1', 2-trichlorethylene (TCE).

BACKGROUND OF THE INVENTION

Chlorinated aliphatic hydrocarbons have long been used as degreasing agents to clean metal parts in the course of manufacturing, maintenance and repair of machinery. These agents have also been in wide use for many years as dry cleaning agents or as solvents in the chemical and related industries. More recently, these agents have been extensively used in the electronics industry. In the long history of these agents, they were frequently disposed of in an indiscriminate manner, or as leakage from holding tanks. This has resulted in chlorinated aliphatic hydrocarbons becoming a major contaminant of groundwater. Among chlorinated aliphatic hydrocarbons, 1,1',2-trichlorethylene (TCE) is the most prevalent environmental contaminant and is found in more National Priority Landfill sites than any other single chemical.

Since chlorinated aliphatic hydrocarbons are toxic and often convertible into even more toxic compounds (for example, tetrachloroethylene is converted into vinyl chloride, a human carcinogen, under anaerobic conditions by bacteria), it is important to find ways to remove them from groundwater, which is the source of drinking water for much of the population. Currently, the most commonly utilized technology for removal of TCE from groundwater is "air stripping", followed in frequency of use by activated carbon absorption. Both of these methods merely move the TCE from one compartment to another, with dilution (in the air) during air stripping or concentration on the carbon by absorption in the latter case. Further, air stripping may soon be outlawed in some parts of the country and carbon absorption creates solid, toxic waste.

Certain bacteria have been reported to degrade TCE, including some anaerobic methanogens (methane-forming bacteria), some aerobic bacteria that degrade one-carbon compounds by preference (methanotrophs), and some toluene-degrading aerobic bacteria. See Brouwer et al., *Appl. Environ. Microbiol.*, 45, 1286 (1983); Vogel et al., *Appl. Environ. Microbiol.*, 49, 1080 (1985); Little et al., *Appl. Environ. Microbiol.*, 54, 951 (1988); Wilson et al., *Appl. Environ. Microbiol.*, 49, 242 (1985); and Nelson et al., *Appl. Environ. Microbiol.*, 54, 604 (1988), respectively. The methanogens are, however, very hard to work with since they are strict anaerobes that have relatively slow specific rates of TCE destruction (with the possibility of forming vinyl chloride from chlorinated aliphatic hydrocarbon congeners found together with TCE) See Vogel et al, supra. The methanotrophs have a more rapid rate of TCE conversion than methanogens, but the time course of their attack upon TCE suggests that TCE is in some way toxic to the cells or to the enzyme(s) functional in TCE conversion. See Wackett et al., *Appl. Environ. Microbiol.*, 54, 1703–1708 (1988). This set of observations is also true of some aerobic bacteria that degrade toluene. See Wackett et al., supra.

In many cases TCE is a co-contaminant with various hydrocarbon fuels, such as gasoline. Accordingly, there is a need for a method to isolate aerobic bacteria that are capable of rapid degradation of TCE while concomitantly metabolizing other hydrocarbon compounds as sources of carbon and energy for growth.

SUMMARY OF THE INVENTION

We have discovered that certain bacteria of the genus Pseudomonas are capable of rapid and complete degradation of TCE with concomitant consumption of relatively little aromatic hydrocarbon as growth substrate. Accordingly, the present invention provides biologically pure strains of these bacteria and methods utilizing the bacteria to detoxify a liquid contaminated with trichlorethylene (TCE).

In a preferred embodiment of the present invention, a method of detoxifying a liquid contaminated with trichlorethylene (TCE) is provided. The method comprises the step of introducing a bacterium of the genus Pseudomonas into a contaminated medium comprising TCE at an initial concentration of up to at least about 1.11 mM, and an amount of a hydrocarbon mixture effective to sustain growth of the bacterium. The bacterium is capable of sustained growth solely on the hydrocarbon mixture, which includes a branched chain alkyl-substituted aromatic hydrocarbon. Preferably, the bacterium is capable of providing a substantially linear kinetic course of substantially complete removal of the TCE. Preferably, the initial concentration of TCE in the medium ranges from an undetectable level to about 2.79 mM. The preferred amount of the branched chain alkyl-substituted aromatic hydrocarbon effective to sustain growth of the bacterium is about 0.07–0.2% by volume of the medium.

It should be noted that in the cultures or test systems utilized in the present invention, TCE can be partitioned into three different phases: an organic phase, an aqueous phase, and the headspace (gas phase). The concentration of TCE in each phase changes as the hydrocarbon energy source is utilized and TCE is destroyed. The TCE molarities stated herein, expressed in millimolar (mM), were calculated by dividing the amount of TCE in moles by the total volume of the liquid (organic and aqueous) phase.

As used herein, "undetectable level" means an amount or concentration of TCE which is so small as to be undetectable by standard flame ionization detection or gas chromatographic methods.

In another preferred embodiment of the present invention, a method for detoxifying a liquid contaminated with TCE is provided which comprises introducing a bacterium of the genus Pseudomonas into a contaminated medium including TCE and an amount of a branched chain alkyl-substituted aromatic hydrocarbon effective to sustain growth of the bacterium. The bacterium is capable of substantially complete degradation of the TCE at a rate of up to about 32 nmol hr$^{-1}$ mg cells based upon the dry weight of the cells, and is capable of sustained growth solely on the branched chain alkyl-substituted aromatic hydrocarbon. Preferably, the branched chain alkyl-substituted aromatic hydrocarbon is isobutylbenzene.

The present invention further provides biologically pure strains of the genus Pseudomonas comprising a bacterium cultured in a medium comprising a branched chain alkyl-substituted aromatic hydrocarbon as a carbon and energy source of the bacterium, wherein the cultured bacterium is capable of substantially complete degradation of TCE at a rate of up to 32 nmol $hr^{-1}$ mg $cells^{-1}$ based upon the dry weight of the cells, and wherein the bacterium is capable of sustained growth solely on the branched chain alkyl-substituted aromatic hydrocarbon.

Advantageously, the bacteria of the present invention permit highly effective degradation of the TCE and related chlorinated aliphatic hydrocarbons at a non-decreasing rate with concomitant consumption of relatively little aromatic hydrocarbon as growth substrate.

It is expected that methods known in the art could be employed to produce mutations of the biologically pure strain described herein which would also possess useful properties with respect to the degradation of TCE or other chlorinated aliphatic hydrocarbons. Certain mixed cultures isolated in accordance with the methods described herein are also expected to exhibit useful properties for degradation of TCE and related chlorinated aliphatic hydrocarbons.

The bacteria of the present invention can be used by one of skill in the art as agents for bioremediation of chlorinated aliphatic hydrocarbon contaminated waters by either in situ treatment, or by pumping water from the ground and soil and passing it through a treatment tank fed with nutrients and substrates for bacterial growth and metabolism and maintained at pH and temperature conditions to afford degradation of the contaminants. In either case, the contaminated material (e.g. soil or water) having chlorinated aliphatic hydrocarbon concentrations of up to about 2.79 mM is brought into contact with an effective amount of bacteria of the present invention.

Other features and advantages of the invention will be apparent from the following detailed description and appended claims.

DETAILED DESCRIPTION OF THE INVENTION

A. Characteristics of TCE-Degrading Bacteria

Figure 1A:
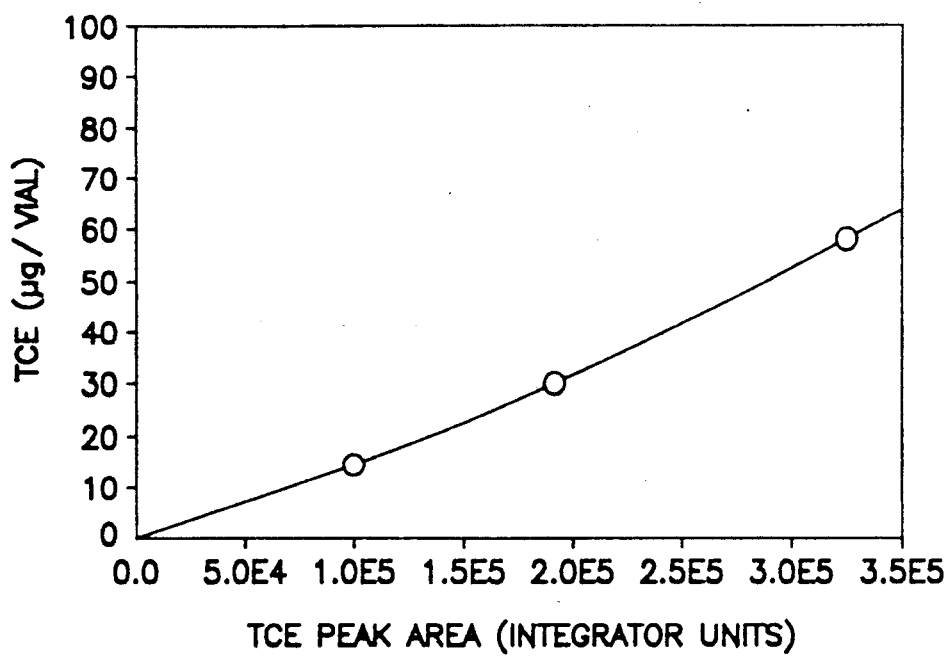
FIG. 1(A) is a graphical representation of a TCE headspace calibration curve which was utilized to obtain the TCE values depicted in FIG. 1(B).

The present invention provides methods of detoxifying TCE-contaminated liquids. These methods utilize TCE-degrading bacteria which are members of the genus Pseudomonas. A preferred embodiment of the bacteria, the biologically pure strain *Pseudomonas stutzeri* $IBB_2$, has the characteristics set forth in Table I, below. A closely related strain of *Pseudomonas stutzeri* identified as $IBB_3$, exhibits similar morphology to strain $IBB_2$, except that $IBB_3$ colonies are light brown, fried egg-type with undulate edges after 48 hours. Like $IBB_2$, the strain $IBB_3$ uses isobutylbenzene as a carbon and energy source. Other members of the genus Pseudomonas that are expected to exhibit useful properties with respect to TCE degradation include bacteria of the strains Pseudomonas sp. $ALS_3$, ATCC No. 53902, and *Pseudomonas stutzeri* $TCE_3$, ATCC No. 53819.

TABLE I

| Characteristics of Strain *Pseudomonas stutzeri* $IBB_2$ | |
| --- | --- |
| Morphology: | Tan to light brown flat, wrinkled or corded colonies with undulate edges. Colonies produce a creamy capsular material after 48–72 hours growth on yeast extract agar. Produces indentations in agar just the size of the colony. Cell morphology from wet mounts: fast, small, motile rods. |
| Flagella Stain: | Two flagella with polar insertion |
| Gram Stain: | Negative |
| Physiology: | Positive with respect to: Oxidase, catalase Fluorescent pigment production Aerobic growth and acid production with glucose Denitrification Starch hydrolysis Aerobic growth with maltose Aerobic citrate utilization Negative with respect to: Phenazine pigment production Anaerobic growth and/or acid production with glucose Gelatin hydrolysis Tween hydrolysis Arginine dihydrolase $H_2S$ production Indole production from tryptophan Aerobic growth with xylose Urease |
| Tolerance: | Can grow in the presence of a nominal concentration of 1 mM TCE (2.7 μg (1.85 μl) of TCE added to 20 ml of medium) |
| Growth Characteristics: | Cells enter exponential growth in about 24 hrs and continue to grow exponentially until about 60 hours, with a starting concentration of about $2 \times 10^5$ cells/ml in standard mineral medium at 20° C., under shaking, and with isobutylbenzene as the sole carbon source. During exponential growth period, a bright yellow, water soluble metabolite accumulates in the medium which slowly disappears from the culture by about 96 hours During exponential growth period and through about 72 hours, TCE is degraded at a rate of about 32 nmol $hr^{-1}$ mg of $cells^{-1}$. |
| Carbon Sources Utilized: | Isobutylbenzene Toluene Ethylbenzene Starch Glucose Maltose Citrate |
| Lyophilization: | Has been performed |
| ATTC Deposit No.: | 53817 |

B. Growth of Bacteria

In a preferred embodiment of the present invention, the bacteria are capable of sustained growth solely on a hydrocarbon mixture comprising at least one branched chain alkyl-substituted aromatic hydrocarbon. The hydrocarbon mixture can also comprise trace amounts of the elements nitrogen, phosphorous, and sulfur. Commercial unleaded gasoline is an example of the hydrocarbon mixture suitable for use in the present invention.

The branched chain alkyl-substituted aromatic hydrocarbons useful in the present invention include those which comprise at least one aromatic hydrocarbon moiety and at least one branched chain alkyl group as a substituent of the at least one aromatic moiety. A preferred branched chain alkyl-substituted aromatic hydrocarbon of the present invention is isobutylbenzene.

The at least one aromatic hydrocarbon moiety may be selected from the aryl groups derived by the removal of a hydrogen from aromatic hydrocarbons including, for example, benzene, $C_6H_6$; pentalene, $C_8H_6$; naphthalene, $C_{10}H_8$; anthracene, $C_{14}H_{10}$; phenanthrene, $C_{14}H_{10}$; pyrene, $C_{16}H_{10}$; 1,2-benzopyrene, $C_{20}H_{12}$; and the like.

The branched chain alkyl substituent may be selected from those alkyl groups which have a branched structure and thus are not normal or unbranched; for example, the groups isopropyl, $(CH_3)_2CH-$; isobutyl, $(CH_3)_2CHCH_2-$; tert-butyl, $(CH_3)_3C-$; isopentyl, $(CH_3)_2CHCH_2CH_2-$; isohexyl, $(CH_3)_2CHCH_2CH_2CH_2-$; and the like.

In another preferred embodiment, a bacterium of the present invention is capable of sustained growth solely on the branched chain alkyl-substituted aromatic hydrocarbon, preferably isobutylbenzene. The optimum growth of a preferred bacterium of the strain *Pseudomonas stutzeri* IBB$_2$ in isobutylbenzene takes place within a pH range of about 7.0-8.0, preferably within 7.3-7.7, and most preferably about 7.5, and within a temperature range of about 23-33° C., preferably about 26-30° C., and most preferably about 28° C.

C. Chlorinated Aliphatic Hydrocarbons

The bacteria and methods of the present invention may be utilized to degrade chlorinated aliphatic hydrocarbons. A preferred chlorinated aliphatic hydrocarbon to be degraded by the present invention is 1,1',2-trichlorethylene (TCE). Other chlorinated aliphatic hydrocarbons which may be degraded by the present invention include tetrachloroethylene (PCE), 1,1,1-trichloroethane, 1,2-dichloroethylene (DCE), and vinyl chloride (VC).

D. Detoxification of Contaminated Liquids

The present methods comprise a step of introducing a bacterium of the genus Pseudomonas into a contaminated medium. As used herein, "contaminated medium" is intended to include any aqueous mixture which contains one or more chlorinated aliphatic hydrocarbons concomitantly with one or more branched chain alkyl-substituted aromatic hydrocarbons, as defined above. A typical example of a contaminated medium to which the present detoxification methods are directed is groundwater.

One of skill in the art could use the bacteria of the present invention to bioremediate waters contaminated with chlorinated aliphatic hydrocarbons including TCE. This water bioremediation could be accomplished by either in situ treatment comprising inoculating contaminated ground water with the present bacteria, or by the following system: Water, either from ground or surface sources, is detoxified by pumping it into treatment tanks, where a broth of the present bacteria is added to afford a concentration of about $1 \times 10^6 - 1 \times 10^8$ cells/ml of water. A pump is used to bubble air oxygen through the treatment container for proper aeration. The pH and temperature of the water must be monitored regularly and maintained within a pH range of about 7.0-8.0 and a temperature range of about 15-25° C. so as to afford optimal TCE degradation conditions. Other nutrients, for example $NH^4$, phosphate, and the like, may also need to be added.

One of skill in the art could also use the bacteria of the present invention to bioremediate solids including soil, landfill solids (or leachate), or wood shavings which are contaminated with chlorinated aliphatic hydrocarbons including TCE. This bioremediation could be accomplished by contacting the TCE present in the solid with water so as to extract the TCE, and then degrading the TCE with an effective amount of the present bacteria plus a carbon source. Preferably the solid will be slurried or leached with water (the leachate) in order to remove the TCE therefrom. To increase the amounts of solid that can be detoxified with a given volume of leachate, the leachate preferably is intermittently or continuously recycled through the solid, thus greatly increasing the TCE levels in the collected leachate to be detoxified, and maximizing the detoxification efficiency of the bacteria.

Using any of these bioremediation methods, the contaminated water or solid having chlorinated aliphatic hydrocarbon concentrations of up to about 2.79 mM will be brought into contact with an effective amount of bacteria of the present invention.

The invention will be further described by reference to the following detailed examples.

EXAMPLE I

TCE Degradation by Bacteria of the Strain Pseudomonas Stutzeri IBB$_2$

A. IBB$_2$ Isolation Protocol

A standard liquid mineral medium was prepared as disclosed by Jones and Edington, *J. Gen. Microbiol.*, 52, 381-390 (1968). The medium was amended with 5.7 mM $K_2HPO_4$ so as to supply phosphate as well as to provide a pH buffering effect. The initial pH of the fresh medium thus prepared was 7.5-7.6.

A 1.0 g soil sample was added to 0.2 ml isobutylbenzene (spectrophotometric grade, Aldrich Chemical Company, Milwaukee, Wisconsin) and 19 ml of the fresh Jones medium in a 125 ml Teflon-lined, screw-capped flask. The soil sample was collected at the Rock Island petroleum refinery in Indianapolis, Indiana. The contents of the flask were incubated at 20° C. for 4 days. At the end of 4 days, a 1 ml portion of the contents of the flask was removed and transferred to fresh medium and fresh isobutylbenzene in the same amounts as initially used, and the incubation repeated. This incubation and transfer procedure was performed a total of five times.

At the completion of five transfers, a loopful of culture was spread on fresh medium with isobutylbenzene spread on filter paper in the lid of a Petri dish. Individual bacteria were manually picked from colonies growing in the culture and restreaked to obtain pure cultures. Several different strains of bacteria were identified according to the criteria of Stanier et al., *J. Gen. Microbiol.*, 43, 159 (1966). One of these strains exhibited the specific identifying characteristics listed in Table I, above. Based upon these characteristics, the strain was specifically identified as *Pseudomonas stutzeri* IBB$_2$.

B. Growth of Isolated IBB$_2$ Solely on Isobutylbenzene

Following the identification of IBB$_2$ as described above, individual colonies of IBB$_2$ were transferred back into a mixture of fresh Jones and Edington mineral medium and fresh isobutylbenzene in order to test the ability of the strain to grow using a branched chain alkyl-substituted aromatic hydrocarbon as the sole carbon and energy source. More particularly, the IBB$_2$ colonies were transferred into a mixture of 20 ml mineral medium and 0.2 ml isobutylbenzene, and the colonies were grown in this mixture for 2 days (48 hours) at 20° C. By visual inspection and colorimetry, the IBB$_2$ colonies were capable of sustained growth in this environment based upon the greatly increased turbidity observed and the production of yellow-colored metabolites.

C. Aerobic Degradation of TCE in Isobutylbenzene by IBB$_2$

The isolated strain, IBB$_2$, was tested to determine whether bacteria of the strain were capable of sustained growth in the presence of a significant concentration of TCE concomitant with isobutylbenzene, and further whether the bacteria were capable of substantially completely degrading the TCE at the concentration present.

This testing was accomplished by performing aerobic TCE degradation experiments in 10 ml serum vials. Isolated cells of IBB$_2$ and controls were prepared according to the isolation protocol of Part A above. Vials identical to experimental vials but supplied with dead (heat-killed) cells were also sampled and analyzed to control for non-biological chemical conversion of TCE and its loss from the container by volatility. 0.2 ml of the IBB$_2$ cell culture was diluted into 1.8 ml of fresh Jones and Edington medium placed in a 10 ml vial. Each vial then received 2.0 $\mu$l isobutylbenzene spiked with 0.02 $\mu$l TCE. The resulting concentration of TCE initially present in the vials was about 0.109 mM. The isobutylbenzene initially present constituted about 0.09 percent of the total volume of liquid in each vial. Serum vials were capped with 20 mm Teflon-lined silicone rubber septa that were crimp-sealed with 20 mm standard metal closures. The vials were incubated at 28° C. with shaking for 4 days. Vials were sacrificed at 24, 48, 72, and 96 hours, and were frozen at −2° C. to stop growth. The headspace of each vial was analyzed as described below.

D. Preparation of TCE Headspace Calibration Curve

In order to measure TCE degradation over time, a standard calibration curve relating flame ionization detector response to TCE concentration in the headspace was prepared by reconstruction. 0.2 ml of IBB$_2$ cell suspension, 1.8 ml of Jones and Edington medium and 2.0 $\mu$l of isobutylbenzene containing varying, known amounts of TCE were added to replicate 10 ml vials. The vials were sealed, shaken briefly to mix their contents, frozen at −2° C. to stop growth, thawed and the headspace of each vial analyzed as described below. A graph relating amount of TCE added to detector response was prepared which is shown in FIG. 1(A). Each point designated as an open circle on the standard curve represents several nearly identical values from independent determinations plotted together.

E. Headspace Analysis

After warming the vials to room temperature of 20° C., headspace samples of 25 $\mu$l were withdrawn from each vial using a Hamilton syringe fitted with a Chaney adaptor. Each headspace sample was injected directly into a Hewlett-Packard 5710A gas chromatograph (GC) equipped with a flame ionization detector (FID). The temperature program was 50° C. for 2 min with a temperature ramp of 8° C./min to 220° C. A 3 m × 3 mm column packed with 10% SP-2100 on 80/100 mesh Supelcoport (Supelco, Inc.) was used. Gas flows were 240 ml/min air, 30 ml/min hydrogen, and 40 ml/min helium as carrier gas. All results were recorded on a Hewlett-Packard 3390A integrator.

F. Results of Headspace Analysis

Each sacrificed culture was analyzed by gas chromatography with flame ionization detection as described in Part E above. The output peaks obtained by FID analysis of IBB$_2$ in isobutylbenzene and TCE were used to determine the quantity of TCE remaining in solution (in $\mu$g/vial) by comparing the integrated area under the TCE peaks with the peak area of the standard calibration curve shown in FIG. 1(A), after correcting for losses of TCE in controls. The calculated amounts of TCE remaining in the vials on a percentage basis are shown in Table II, below.

TABLE II

| Results of Headspace Gas Chromatography/Flame Ionization Detection Analysis of IBB$_2$ | |
|---|---|
| Time (hours) | % of TCE Remaining in Vials |
| 24 | 73.0 |
| 48 | 43.2 |
| 72 | 13.1 |
| 96 | <0.03[a] |

[a]Limit of detection for FID.

Figure 1B:
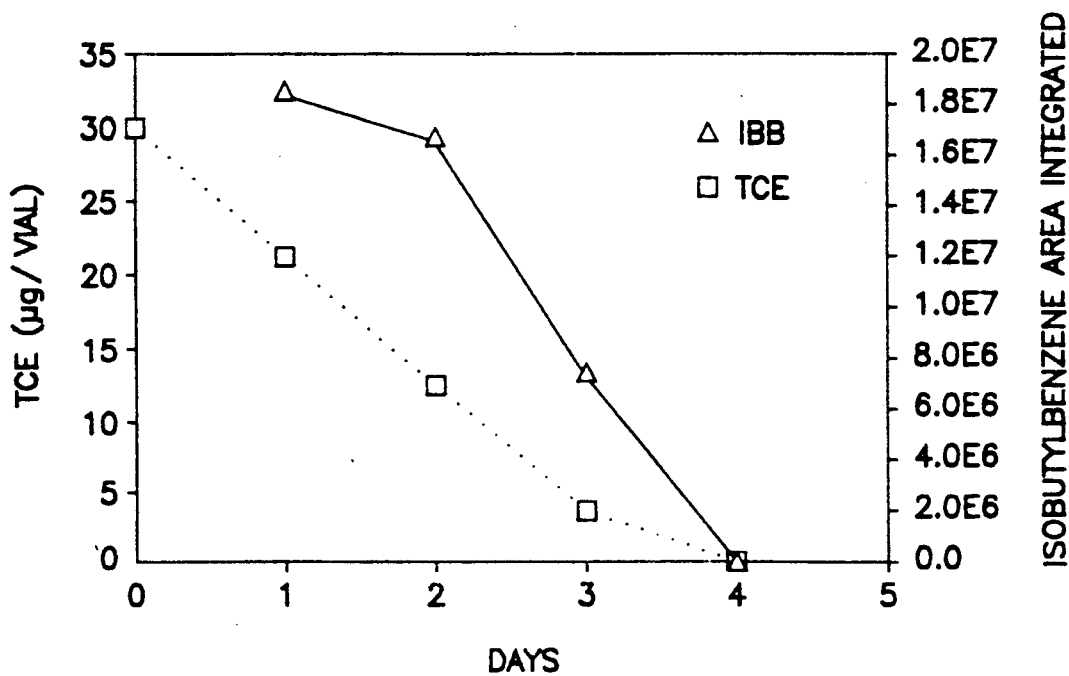
FIG. 1(B) is a graphical representation of TCE degradation by bacteria of the strain *Pseudomonas stutzeri* $IBB_2$ while the bacteria are growing in isobutylbenzene.

FIG. 1(B) depicts the results of the headspace analysis in terms of TCE degradation by IBB$_2$ in isobutylbenzene over time. FIG. 1 includes two curves: curve (1) represents the amount of TCE in $\mu$g remaining in the vials over time, and curve (2) represents the remaining amount of isobutylbenzene, calculated by integrating the area under the GC output peak for isobutylbenzene, over the same time scale.

Curve (1) of FIG. 1(B) demonstrates that TCE removal by IBB$_2$ in the presence of isobutylbenzene was substantially complete at Day 4; i.e. the remaining percentage of TCE in the vials at Day 4 was less than about 0.03%, the minimum amount detectable by flame ionization detection (FID). Curve (1) further demonstrates that TCE removal during this period followed a substantially linear kinetic course. FIG. 1(B) also demonstrates that the degradation of TCE occurred concomitantly with the oxidation of isobutylbenzene.

From the data of Table II and dry weight measurements of the strain, it was calculated that the rate of TCE degradation by IBB$_2$ growing in isobutylbenzene is about 32 nmol hr$^{-1}$ mg cells$^{-1}$ (dry weight). This rate was calculated by dividing the rate of loss of TCE (nmol hr$^{-1}$) by the known amount of cells (mg, dry weight) added.

EXAMPLE II

TCE Degradation by Bacteria of the Strains Pseudomonas sp. ALS$_3$ and Pseudomonas stutzeri TCE$_3$ A. ALS$_3$ Isolation Protocol Bacterial cell cultures were grown from soil samples in a mixture of mineral medium (11.5 mM K$_2$HPO$_4$) prepared according to the method of Jones and Edington, *J. Gen. Microbiol.*, 52, 381-390 (1968), with commercial unleaded gasoline as a carbon source. As in Example I, the soil sample was collected at the Rock Island petroleum refinery in Indianapolis, Indiana.

More particularly, the bacterial cell cultures were enriched by adding 1.0 g of the soil to 20 ml of the mineral medium and 1 ml commercial unleaded gasoline. This mixture was maintained at a temperature of about 20° C. for about 5 days and transferred to homologous medium twice after growth had occurred. The latter step was necessary in order to dilute out contaminants in the original inoculum.

Bacterial strains were isolated by streaking from the final (third) culture on Jones and Edington medium with 0.2 ml commercial unleaded gasoline as the sole carbon and energy source in the lid of glass Petri dishes. Individual bacteria were manually picked out of the culture. Several strains of bacteria were identified according to the criteria disclosed by Bergey's Manual of Systematic Bacteriology, Williams and Wilkins, pub., 140-213 (1984), incorporated herein by reference. Based upon these characteristics, the strain was specifically identified as Pseudomonas sp. $ALS_3$.

B. Isolation of $TCE_3$ Following Further Enrichment with TCE

After enrichment with commercial unleaded gasoline as the sole carbon and energy source according to part A above, the bacterial culture was additionally tested for TCE resistance. TCE-resistant strains were sought by streaking on liquid mineral medium prepared according to the method of Jones and Edington, supra, using 0.2 ml commercial unleaded gasoline and 20 μl TCE in the lid of a glass Petri dish, for a resultant TCE concentration of 1.11 uM in the organic phase.

Several TCE-resistant strains of bacteria were identified according to the criteria disclosed by Bergey's *Manual of Systematic Bacteriology*, supra. Based upon these characteristics, the strain was specifically identified as Pseudomonas stutzeri $TCE_3$.

C. Screening of Strains Isolated from $AG_2$ without TCE for Resistance to TCE Several strains previously isolated from commercial unleaded gasoline enrichments without TCE, including $ALS_3$, were subsequently screened for resistance to TCE. The strains were tested for ability to grow in mixtures of commercial unleaded gasoline and TCE, the mixtures having an initial TCE concentrations of 11.1, 5.57, 2.79, and 1.11 mM, respectively. No growth was observed by any strain at TCE concentrations of 11.1, 5.57, and 2.79 mM. Only one strain, $ALS_3$, grew on commercial unleaded gasoline in the presence of 1.11 mM TCE. This was evidenced by a bright yellow water-soluble color in the culture fluid. Table III below demonstrates the results of the TCE screenings at TCE concentrations of 1.11 and 2.79 mM.

TABLE III

Results of Screening Commercial Unleaded Gasoline-Enriched Strains for Ability to Grow in the Presence of TCE[a]

| Strains tested | TCE concentration (mM) | |
|---|---|---|
| | 2.79 | 1.11 |
| P. putida H[b] | − | − |
| P. putida $I_2$ | − | − |
| P. putida $ALS_1$ | − | − |
| Pseudomonas sp. $ALS_3$ | − | + |
| Alcaligenes sp. $GTS_3$ | − | − |
| P. putida $LFN_1$ | − | − |
| P. putida $Hex_2$ | − | − |

TABLE III-continued

Results of Screening Commercial Unleaded Gasoline-Enriched Strains for Ability to Grow in the Presence of TCE[a]

| Strains tested | TCE concentration (mM) | |
|---|---|---|
| | 2.79 | 1.11 |
| P. putida $SSN_4$ | − | − |
| P. fluorescens $SSS_3C$ | − | − |

[a]All growth was recorded as + for growth and − for no growth.
[b]H was unable to grow in the presence of 100 ppm TCE, but viable cells were found in the culture by plating on mineral agar with gasoline.

D. Aerobic Degradation of TCE by $ALS_3$ and $TCE_3$ While Growing on $AG_2$ Based on their resistance to TCE, strains $ALS_3$ and $TCE_3$ were chosen for further aerobic TCE degradation experiments.

The carbon source used in this experiment was an artificial gasoline mixture, identified herein as $AG_2$. The formula for the artificial gasoline mixture $AG_2$ is shown in Table IV below:

TABLE IV

| $AG_2$ Artificial Gasoline Mixture | |
|---|---|
| Compound | Amount Added (ml or g)[a] |
| benzene | 5.0 ml |
| toluene | 20.0 ml |
| ethylbenzene | 10.0 ml |
| p-xylene | 5.0 ml |
| m-xylene | 5.0 ml |
| o-xylene | 5.0 ml |
| propylbenzene | 5.0 ml |
| 1,2,4-trimethylbenzene | 5.0 ml |
| isobutylbenzene | 5.0 ml |
| p-cymene | 5.0 ml |
| 1,2,4,5-tetramethylbenzene | 0.2 g |
| naphthalene | 0.5 g |
| pentamethylbenzene | 0.2 g |
| 1-methylnaphthalene | 0.2 g |
| 2-methylnaphthalene | 0.2 g |
| hexamethylbenzene | 0.05 g |

[a]Compounds listed in grams are solids at room temperature.

25 ml each of $ALS_3$ and $TCE_3$ cells were transferred to replicate 125 ml flasks fitted with Teflon-lined screw caps (Bellco, Vineland, NJ), at an initial density of $5 \times 10^6$ cells/ml. Controls were inactivated by heating at 70° C. for 20 min.

After cooling, 10 μl of $AG_2$ containing 1 μl (10.91 μmols) of TCE was added to each flask, and the flasks were sealed. Thus TCE was present in each flask at an initial concentration of about 0.99 M in the gasoline phase, and about 0.56 mM in the entire mixture. Replicate cultures and controls were incubated at 30° C. for 5 days with shaking. Flasks were sacrificed each day and were immediately frozen at −20° C. to stop growth.

E. Results of Aerobic TCE Decradation Experiments with $ALS_3$ and $TCE_3$

Figure 2:
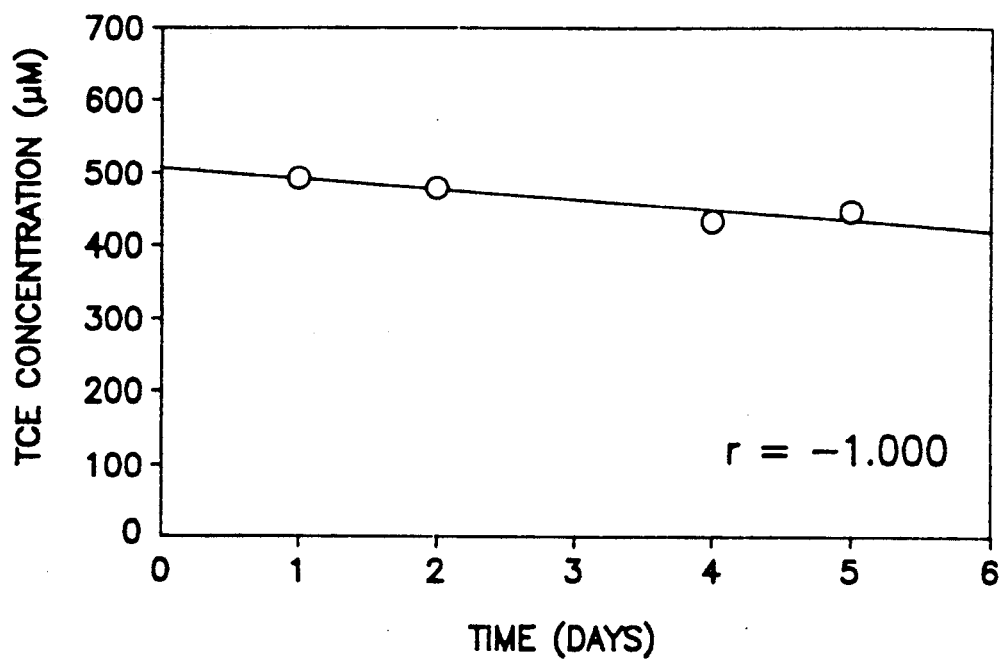
FIG. 2 is a graphical representation of TCE degradation by bacteria of the strain Pseudomonas sp. $ALS_3$ while the $ALS_3$ are growing on an artificial gasoline mixture, identified herein as $AG_2$.
Figure 3:
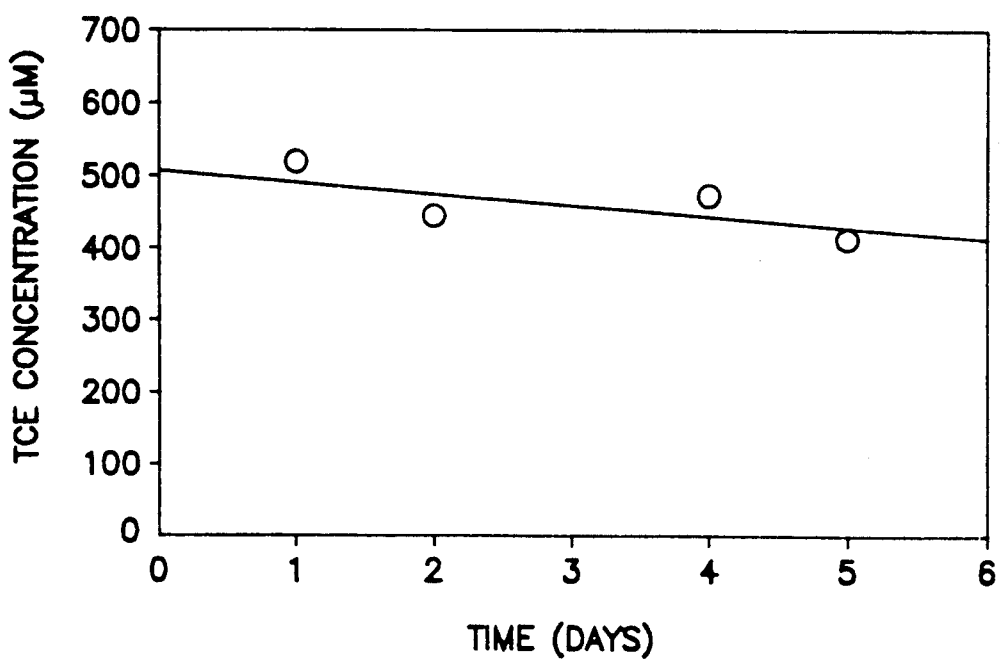
FIG. 3 is a graphical representation of TCE degradation by bacteria of the strain *Pseudomonas stutzeri* $TCE_3$ while the $TCE_3$ are growing on the artificial gasoline mixture $AG_2$.

Table V below lists the results of the aerobic degradation experiments described in Part E above. FIGS. 2 and 3 demonstrate these results graphically over a time period of five (5) days, for TCE degradation by $ALS_3$, and by $TCE_3$, respectively. Both strains showed significant reductions in TCE during this period. FIGS. 2 and 3 further demonstrate that both strains, particularly $ALS_3$, were capable of providing a substantially linear kinetic course of TCE removal over the five-day period. As noted in FIG. 2, the correlation coefficient for linear degradation of TCE by strain ALS$_3$ was calculated to be $-1.000$.

From the data of Table V and dry weight measurements of the individual strains, the specific rates of TCE degradation were calculated. These rates are shown in Table VI, below.

TABLE V.

Results of TCE Degradation by Strains ALS$_3$ and TCE$_3$ while Growing on Artificial Gasoline AG$_2$
TCE concentration (μM)

| Strains tested | Time (days) | | | |
|---|---|---|---|---|
| | 1 | 2 | 4 | 5 |
| TCE$_3$ | 506 | 455 | 468 | 423 |
| ALS$_3$ | 492 | 475 | 443 | 443 |

TABLE VI.

First Order TCE Degradation Rates

| Strain | K value (hr) | R value[b] | Degradation rate[a] (nmol hr$^{-1}$ mg cells$^{-1}$) |
|---|---|---|---|
| TCE$_3$ | −0.0014 | −0.811 | 11.7 |
| ALS$_3$ | −0.0015 | −1.000 | 12.5 |
| Control | −0.0001 | 0.363 | 0.8 |

[a]Cells are reported as dry weight.
[b]Correlation coefficient from linear regression analysis.

The invention has been described by reference to certain preferred embodiments and methods. However, it should be understood that many variations and modifications may be made while remaining within the spirit and scope of the invention.

What is claimed is:

1. A method of detoxifying a liquid contaminated with trichlorethylene (TCE), said method comprising the step of introducing a bacterium of the genus Pseudomonas into a contaminated medium comprising:
   a) an amount of a branched chain alkyl-substituted aromatic hydrocarbon effective to sustain growth of the bacterium, and
   b) TCE, wherein the bacterium is capable of substantially complete degradation of the TCE at a rate of up to about 32 nmol hr$^{-1}$ mg cells$^{-1}$ based upon the dry weight of the cells, and further wherein the bacterium is capable of sustained growth solely on the branched chain alkyl-substituted aromatic hydrocarbon.

2. The method of claim 1 wherein the branched chain alkyl-substituted aromatic hydrocarbon is isobutylbenzene.

3. The method of claim 1 wherein the TCE is present in the contaminated medium at an initial concentration of up to at least about 1.11 mM.

4. The method of claim 1 wherein the amount of the branched chain alkyl-substituted aromatic hydrocarbon effective to sustain growth of the bacterium is about 0.07–0.2 percent by volume of the contaminated medium.

5. The method of claim 1 wherein the substantially complete degradation of the TCE occurs concomitantly with the growth of the bacterium.

6. The method of claim 1 wherein the bacterium has the characteristics of ATCC deposit No. 53817 and the mutations thereof.

7. A biologically pure strain of the genus Pseudomonas comprising a bacterium cultured in a medium comprising a branched chain alkyl-substituted aromatic hydrocarbon as a carbon and energy source of the bacterium, wherein the cultured bacterium is capable of substantially complete gradation of TCE at a rate of up to about 32 nmol hr$^{-1}$ mg cells$^{-1}$ based upon the dry weight of the cells, and wherein the bacterium is capable of sustained growth solely on the branched chain alkyl-substituted aromatic hydrocarbon.

8. The biologically pure strain of claim 7 wherein the branched chain alkyl-substituted aromatic hydrocarbon is isobutylbenzene.

9. The biologically pure strain of claim 7 wherein the cultured bacterium is capable of substantially complete degradation of TCE present at an initial concentration of up to at least about 1.11 mM.

10. The biologically pure strain of claim 7 wherein the bacterium has the characteristics of ATCC deposit No. 53817 and the mutations thereof.

11. A method of detoxifying a liquid contaminated with trichlorethylene (TCE), said method comprising the step of introducing a bacterium of the genus Pseudomonas into a contaminated medium comprising:
   a) an amount of a hydrocarbon mixture effective to sustain growth of the bacterium, wherein the hydrocarbon mixture comprises a branched chain alkyl-substituted aromatic hydrocarbon; and
   b) TCE at an initial concentration of up to at least about 1.11 mM, wherein the bacterium is capable of sustained growth solely on the hydrocarbon mixture.

12. The method of claim 11 wherein the bacterium has the characteristics of ATCC No. 53817 and the mutations thereof.

13. The method of claim 11 wherein the bacterium has the characteristics of ATCC No. 53819 and the mutations thereof.

14. The method of claim 11 wherein the bacterium is Pseudomonas sp. ALS$_3$.

15. The method of claim 11 wherein the bacterium is capable of providing a substantially linear kinetic course of substantially complete removal of the TCE.

16. The method of claim 15 wherein the bacterium has the characteristics of ATCC No. 53817 and the mutations thereof.

17. The method of claim 15 wherein the bacterium has the characteristics of ATCC No. 53819 and the mutations thereof.

18. The method of claim 15 wherein the bacterium is Pseudomonas sp. ALS$_3$.

19. The method of claim 11 wherein the initial concentration of TCE is from an undetectable level to about 2.79 mM.

20. The method of claim 19 wherein the bacterium has the characteristics of ATCC No. 53817 and the mutations thereof.

21. The method of claim 19 wherein the bacterium has the characteristics of ATCC No. 53819 and the mutations thereof.

22. The method of claim 19 wherein the bacterium is Pseudomonas sp. ALS$_3$.

* * * * *

UNITED STATES PATENT AND TRADEMARK OFFICE
CERTIFICATE OF CORRECTION

PATENT NO. : 5,024,949

DATED : June 18, 1991

INVENTOR(S) : George D. Hegeman et al.

It is certified that error appears in the above-identified patent and that said Letters Patent is hereby corrected as shown below:

At column 1, line 60, after "TCE" insert --.--

At column 1, line 60, for "al," read --al.,--

At column 3, line 64, after "IBB$_3$," insert --ATCC No. 53872,--

At column 10, line 56, for "Decradation" read --Degradation--

At column 12, line 6, for "gradation" read --degradation-- .

Signed and Sealed this

Fourth Day of January, 1994

Attest:

BRUCE LEHMAN

*Attesting Officer*     Commissioner of Patents and Trademarks